United States Patent Office 3,539,298
Patented Nov. 10, 1970

3,539,298
PRODUCTION OF HYDROGEN FROM CARBON MONOXIDE AND WATER UNDER LIQUID PHASE REACTION CONDITIONS IN THE PRESENCE OF A BASIC NITROGEN COMPOUND
Donald M. Fenton, Anaheim, Calif., assignor to Union Oil Company of California, Los Angeles, Calif., a corporation of California
No Drawing. Continuation-in-part of application Ser. No. 664,061, Aug. 29, 1967. This application May 5, 1969, Ser. No. 821,976
The portion of the term of the patent subsequent to Jan. 20, 1987, has been disclaimed
Int. Cl. C01b 1/05, 1/03, 31/20
U.S. Cl. 23—213
11 Claims

ABSTRACT OF THE DISCLOSURE

The invention comprises an improved method of producing hydrogen by contacting carbon monoxide and water under liquid phase reaction conditions at a temperature between 50° and 400° C. in the presence of a Group VIII noble metal catalyst and in the presence of a basic nitrogen compound in sufficient quantity to maintain alkaline conditions. The addition of the basic nitrogen compound has been found to beneficially affect the Group VIII noble metal catalyst such that high yields of hydrogen may be obtained under liquid phase conditions at low temperatures.

DESCRIPTION OF THE INVENTION

This application is a continuation-in-part of application Serial No. 664,061, filed Aug. 29, 1967, now U.S. 3,490,872 issued Jan. 20, 1970.

The invention relates to the production of hydrogen by the well-known shift reaction wherein carbon monoxide and water are reacted to form carbon dioxide and hydrogen. In particular, the invention relates to an improved method of conducting the reaction in the liquid phase at low temperatures.

The shift reaction has been known and practiced commercially for decades but heretofore has been performed at severe reaction conditions including high temperatures and pressures and the catalyst employed has been used in heterogeneous vapor phase contacting. A problem encountered with the shift reaction is that to attain a conversion level sufficiently high for commercial utilization, it is necessary to use high temperatures, in excess of about 350° C. At these high temperatures the equilibrium constant in the reaction:

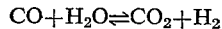

$$CO + H_2O \rightleftharpoons CO_2 + H_2$$

decreases to a low value. Consequently the shift reaction as commonly practiced represents a compromise between a desired high conversion level and a satisfactory equilibrium constant to permit a high yield of hydrogen. In addition, the severity of the conditions necessary to achieve a satisfactory conversion rate have essentially precluded liquid phase reactions and necessitated the use of a vapor phase reaction.

Low temperature, liquid phase processes such as that described in U.S. Pat. 1,843,540 have been proposed, however, these processes have not achieved commercial recognition due to the low conversion rates at the mild temperatures and/or the high pressures required to attain a tolerable conversion level.

It is an object of this invention to provide a catalyst for the shift reaction that permits achieving high yields at mild temperatures under liquid phase reaction conditions.

It is another object of this invention to improve the conversion level in a liquid phase shift reaction process.

Other and related objects will be apparent from the following description.

The invention comprises contacting carbon monoxide and water in the presence of a liquid phase containing a Group VIII noble metal catalyst and a sufficient amount of a basic nitrogen compound, to be fully described hereinafter, e.g., ammonium hydroxide, ethylene diamine, etc., to provide a pH of the reaction medium of 7.1–14, preferably from 7.5 to 12. The contacting can be effected at temperatures from 50° to 650° C., preferably 100° to about 400° C., and most preferably from 100° to 250° C.; and pressures from 1 to 500 atmospheres absolute sufficient to maintain liquid phase reaction conditions. As will be apparent, the addition of a basic nitrogen compound enables an operator to conduct the shift reaction at mild temperatures where equilibrium conditions favor hydrogen production.

By the term "liquid phase conditions," reactions conducted in the presence of an actual liquid phase are included as well as those conducted in a pseudo liquid phase where both the temperature and pressure exceed the critical values for the liquids involved. Preferably, the carbon monoxide pressures used are sufficient to maintain liquid phase reaction conditions and a substantial solubility of the carbon monoxide in the liquid or pseudo liquid phase. Generally, carbon monoxide pressures of 5–120 atmospheres absolute, preferably 20–80 atmospheres are sufficient to achieve these objectives.

As will be apparent from the comparable results shown in the examples, the addition of the basic nitrogen compound, e.g., ammonia, ethanolamine, triethylenediamine, ethylene diamine and pyridine in a quantity sufficient to maintain alkaline conditions has been found to increase the reactivity of the Group VIII noble metal catalyst. The exact mechanism whereby the basic nitrogen compound increases the activity of the catalyst is not known with certainty. The fact that alkaline conditions are maintained does not completely explain the increased activity since, as will be apparent from the examples, addition of sodium hydroxide, a strong base, does not increase the activity of the catalyst to the same extent as does the addition of a basic nitrogen compound. It is possible that the active component is a complex between the basic nitrogen compound and the Group VIII noble metal catalyst such as a metal amine or a metal hydroxoamino complex. In any event, it has been found that the catalyst is much more active when a basic nitrogen compound is included in the reaction medium.

By the term "basic nitrogen compound," included are: ammonia (present in aqueous media as ammonium hydroxide), hydrazine, alkyl and cycloalkyl amines, bifunctional amines such as the alkanolamines, polyamines such as the di-, tri- and quatro-amines, bicycloamines and aromatic heterocyclic amines, etc., which are alkaline in water. These basic nitrogen compounds will be described and illustrated in more detail hereinafter.

The invention is applicable to treatment of carbon monoxide which can be obtained from a variety of processes. In one application a carbon monoxide stream can be obtained as a surplus stream from the basic oxygen steel plants wherein the molten iron is treated with oxygen in a blast furnace operation and produces a gas containing up to 97 percent carbon monoxide. This gas stream after removal of entrained foreign matter and refining to remove gaseous contaminants can be employed as a direct feed to the shift conversion of my invention.

Carbon monoxide containing streams can also be obtained from other, conventional methods used in the manufacture of hydrogen. In these methods, a hydrocarbon stock such as natural gas, refinery gas, virgin and converted gasoline stocks, distillates, fuel oil, crude oil, etc., or carbonaceous solids such as coke or coal are subjected to partial oxidation and/or treatment with steam at high temperatures to form a mixture of carbon monoxide and hydrogen. Hydrocarbon stocks are commonly used for this processing and are converted by contacting with steam or oxygen at high temperatures with or without catalysts. Typically, the hydrocarbons are converted at pressures from about 250 to about 750 p.s.i. and temperatures from about 1250° to about 1950° F. When catalysts are used, the active component is commonly an iron group metal such as nickel, cobalt, iron, etc. The product of this treatment comprises a mixture of carbon monoxide and hydrogen with minor amounts of other materials such as unconverted hydrocarbon, carbon dioxide, nitrogen and oxygen.

In general, therefore, the invention is applicable to the treatment of gas streams having carbon monoxide contents from about 10 to about 100 percent. Preferably the carbon monoxide streams have from about 50 to 100 percent carbon monoxide. The streams can contain hydrogen in amounts from about 0 to 70 volume percent; usually from about 0 to about 50 volume percent. Unconverted hydrocarbons up to about 5 to 10 percent can be present together with minor amounts, up to about 15 percent, of carbon dioxide and nitrogen. Some residual oxygen can also be present up to about 1 volume percent. When applied to the product of a hydrocarbon reforming process for the production of hydrogen, the invention is applied to feedstocks having carbon monoxide contents from about 34 to about 47 volume percent and hydrogen contents from about 52 to about 61 volume percent. When applied to the products of the partial oxidation of hydrocarbons, the invention is applied to a vapor stream having about 10 to 20 percent carbon dioxide, 15 to 30 percent carbon monoxide and 50 to 65 percent hydrogen.

In practice of the invention, carbon monoxide and water are contacted with the basic nitrogen compound and with a minor amount of a Group VIII noble metal catalyst. The Group VIII noble metal can be of the palladium subgroup comprising palladium, rhodium and ruthenium, or can be of the platinum subgroup comprising platinum, osmium and iridium. Preferably the noble metal is rhodium, iridium or platinum, most preferably rhodium because of greater catalytic activity in my process. The contacting can be initiated with the catalyst in the metallic form or the catalyst can be charged to the reaction zone as a soluble salt, oxide or chelate. Examples of suitable materials include the halides, oxides, nitrates, sulfates, carboxylates and cyanides of the aforementioned metals. Examples of these are platinum bromide, palladium chloride, osmium fluoride, iridium bromide, palladium cyanide, iridium cyanide, palladium iodide, platinum nitrate, palladium nitrate, iridium nitrate, palladium oxide, iridium oxide, rhodium oxide, rhodium sulfate, palladium sulfate, iridium cyanide, platinum acetate, palladium propionate, iridium isobutyrate, osmium valerate, rhodium caproate, platinum caprylate, etc. The Group VIII noble metals can also be supplied as chelates such as the acetyl acetonates, or complexes thereof with such conventional chelating agents as ethylene diamine tetraacetic acid and its esters and in particular its salts, citric acid, etc. The Group VIII noble metals can also be supplied to the reaction zone as soluble amine complexes or these amine complexes can be formed in situ by adding any of the aforementioned soluble salts to an aqueous ammoniacal containing from 0.1 to 20 percent ammonia. The Group VIII noble metal is added in catalytic amounts, e.g., 0.001–10 weight percent, preferably 0.001–0.5 percent of the reaction medium.

The ammonia or organic amine is added in sufficient quantities to form an alkaline reaction medium having a pH from about 7.1 to 14.0, preferably a pH from about 7.5 to 12. The basic nitrogen compound may be continually added to the medium or a sufficient quantity of the compound may initially be added to maintain alkaline conditions throughout the reaction. The amount of ammonia or organic amine present in the reaction medium may generally be 0.1–70 volume percent, preferably 3–40 percent of the reaction medium.

The basic nitrogen compound may be added as ammonia, ammonia hydroxide, hydrazine, its hydrate or its salts, or as an organic amine such as the alkyl and cycloalkyl amines containing up to about 10 carbons and the bifunctional alkanolamines, polyamines, bicycloamines and aromatic heterocyclic amines containing up to about 25 carbons. Mixtures of the above materials may also be employed such as ammonical solutions of any of the other nitrogen bases, e.g., ammonia and an aromatic heterocyclic amine, or an alkyl amine and hydrazine, etc. Examples of suitable organic amines include the following:

2-amino-1-butanol;
2-amino-5-diethylaminopentane;
2-(2-aminoethoxy)ethanol;
2-aminopentane;
5-amino-1-pentanol;
1-amino-2,3-propanediol;
N-benzyl-N-methylethanolamine;
n-butylamine;
cyclohexylamine;
cyclohexylaminoethanol;
N,N'-dicyclohexyl-1,3-propanediamine;
cyclooctylamine;
cyclopentylamine;
cyclopropylamine;
1-amino-N-($\beta$-hydroxyethyl)propane;
1,2-diaminopropane;
1,3-diaminopropane;
diethanolamine;
N,N,N',N'-tetramethylethylenediamine;
N,N-diethyl-m-toluidine;
N,N-diethylaniline;
ethanolamine;
ethanolpropanolamine;
2-ethoxyethylamine;
N-ethylaniline;
ethylenediamine;
furfurylamine;
1,6-hexanediamine;
3,3-iminobispropylamine;
isobutylamine;
isopropylamine;
N-isopropylaniline;
3-methoxypropylamine;
N-methylaniline;
N-methylcyclohexylamine;
N-methylfurfurylamine;
propylamine;
tributylamine;
aniline;
2(2-aminoethyl)-pyridine;
2-amino-3-hydroxypyridine;
3-aminoethylpyridine;
2-amino-3-picoline;
2-aminopyridine;
2-anilino-5-nitropyridine;
2-benzylaminopyridine;
4-benzyl-4-hydroxypiperidine;
2-benzylpyridine;
2-bromopyridine;
2-chloro-6-hydroxypyridine;
2-chloropyridine;
2,3,6-trimethylpyridine;
2-cyanopyridine;
N-cyanopyridine;
N-cyclohexylpiperidine;
2,6-diaminopyridine;
3,5-dibromopyridine;
2,3-dichloropyridine;
2,3-dihydroxypyridine;

2-dimethylaminopyridine;
2,6-dimethylpiperidine;
2-ethylpyridine;
3-hydroxy-N-methylpiperidine;
3-hydroxypiperidine;
3-iodopyridine;
2,3-lutidine;
2-morpholino-5-nitropyridine;
2-phenylpyridine;
2-picoline;
piperidine;
2-n-propylpiperidine;
pyridine;
2-pyridylcarbinol;
3-(2-pyridyl)-1-propanol;
5-aminoindole;
5-bromoindole;
5-cyanoindole;
1,2-dimethylindole;
indole-3-carbinol;
2-methylindole;
adenine;
2-amino-6-chloro-4-pyrimidinol;
2-amino-4,6-dihydroxypyrimidine;
2-aminopyrimidine;
2,6-dichloro-7-methylpurine;
2,6-dichloropurine;
6,8-dihydroxypurine;
guanine;
inosine;
purine;
pyrimidine.

Since water is a reactant it is preferred to use water soluble or miscible amines to avoid phase separation in the reaction zone. As apparent to those skilled in the art, the reaction can be performed with the insoluble or immiscible amines by thorough agitation and mixing in the reaction zone to avoid phase separation or to promote sufficient mixing of the water in the organic phase to achieve a satisfactory reaction rate.

The hydrogen produced by the reaction is removed from the reaction zone as a vaporous effluent and, depending upon the alkalinity of the solution and the particular nitrogen compound utilized, the carbon dioxide by-product is removed in this vaporous effluent or is retained in the liquid solution as a carbonate. The reaction can be combined with purification of the hydrogen formed by the shift reaction by the use of a basic nitrogen compound having an ionization constant greater than the first ionization constant of carbonic acid so that the $CO_2$ by-product of the shift reaction will be absorbed by the solution. For this purpose, a preferred basic nitrogen compound is ammonia.

In an embodiment where it is desired that most of the by-product carbon dioxide be removed in the liquid stream as opposed to the vapor stream and that the reaction medium be regenerated, a preferred basic nitrogen compound is an alkyl or cycloalkyl amine or an alkanolamine which form relatively stable carbonates at the mild reaction temperatures and boil at temperatures higher than that required to decompose a carbonate of the amine. In this embodiment, purification means to remove carbon dioxide from the vapor effluent may not be required and a liquid slip-stream containing the amine carbonate may be subjected to a heating treatment to regenerate the reaction medium. Carbon dioxide is removed overhead and the amine which is still contained in the aqueous liquid phase, can be recycled to the shift reaction for further utilization therein.

In another embodiment where economics or other factors favor removing the carbon dioxide by-product from the effluent vapors of the shift reaction rather than from the liquid reaction medium, the basic nitrogen compound is preferably an aromatic heterocyclic amine, e.g., pyridine, which form relatively unstable carbonates. Little, if any, of the carbon dioxide forms a carbonate with the amine and hence only a minor amount of carbonate is contained in the reaction medium. The carbon dioxide may be removed from the effluent vapors by known prior art absorption processes such as the Hot Potassium Carbonate Process or the Giammarco-Vetrocoke Process. The aqueous shift reaction medium may be subjected to a regeneration treatment if desired, however, in some instances this step may be eliminated. In this embodiment, as well as the process wherein an amine which forms a stable carbonate is utilized, the process conditions are correlated with the properties of the amine to achieve the above-described objectives of either removing the carbon dioxide in the aqueous liquid reaction medium or in the effluent vapor stream.

The gases removed from the reaction may contain some unconverted carbon monoxide and this can be recovered and recycled if desired for further conversion. A suitable means for the separation of carbon monoxide and hydrogen and for recovery of the hydrogen from the recycle stream is a permeable noble metal membrane separator. This step is preferably performed downstream of other purification process such as absorption to remove carbon dioxide and/or methanation to remove unconverted hydrocarbon gases.

The invention may be conveniently utilized in a process wherein the hydrogen is produced for the manufacture of ammonia which in turn is used as a reactant for the manufacture of urea. In a typical prior art process, hydrogen and nitrogen are reacted under high pressures to produce ammonia which is reacted with carbon dioxide to form ammonium carbonate. The ammonium carbonate is dehydrated to urea. It can be seen that when ammonia is utilized as the basic nitrogen compound of this invention, ammonium carbonate is formed in the aqueous reaction medium. The reaction medium or a slip-stream of the reaction medium may be removed, the ammonium carbonate concentration increased by an evaporation process and the ammonium carbonate dehydrated to produce urea. In this manner the steps of reacting ammonia with carbon dioxide in the prior art process can be eliminated. Hence, in some instances where urea is a desired product the added basic nitrogen compound is preferably ammonia or ammonium hydroxide.

The invention will now be illustrated and the beneficial results demonstrated by the following Examples 1–3. Examples 4 and 5 demonstrate the results obtainable in the absence of the invention.

Example 1

The following experiments will illustrate the invention using ammonia or ammonium hydroxide as the added basic nitrogen compound.

In the first experiment, a one-gallon autoclave equipped with a mechanical stirrer was charged with 800 milliliters of ammonium hydroxide of 28 weight percent ammonia, and 0.33 gram iridium trichloride. The autoclave was closed, pressured to about 56 atmospheres absolute with carbon monoxide and then heated to 200° C. and maintained at that temperature for 2 hours. Upon completion of the reaction period the autoclave was cooled, depressured, opened and the liquid contents weighed to indicate a weight increase of 41 grams. The liquid phase separated from the reaction was analyzed and found to contain 48 grams carbon dioxide. The gas phase contained 28.6 percent of hydrogen.

The reaction was repeated by charging 800 grams of ammonium hydroxide of 28 weight percent ammonia to the autoclave and adding 0.5 gram of a catalyst comprising 5 percent metallic rhodium on carbon. The autoclave was pressured to about 56 atmospheres absolute with carbon monoxide and heated to 200° C. and maintained at that temperature for 2 hours. At the end of the 2 hour period the final pressure of the autoclave was about 46 atmospheres and the autoclave was then cooled, depressured, opened and the liquid contents weighed to reveal a 27 gram weight increase. The gas from the autoclave was collected and analyzed for hydrogen and found to contain 24.8 volume percent hydrogen. No carbon dioxide was contained in the product gas and the liquid contained 6.2 weight percent carbon dioxide as ammonium carbonate.

The reaction was repeated by charging 800 grams of ammonium hydroxide of 28 weight percent ammonia and 0.33 gram of rhodium trichloride. The autoclave was pressure to about 56 atmospheres with carbon monoxide and heated to 200° C. and maintained at that temperature for two hours. Upon completion of the two hour period the autoclave was cooled and its pressure was observed to be about 46 atmospheres. The autoclave was then depressured and opened and the liquid contents weighed to reveal a 42 gram weight increase. The vapor effluent from the autoclave was collected and analyzed for hydrogen and found to contain 27.3 percent hydrogen and 1.67 percent carbon dioxide. The liquid recovered from the autoclave contained 12.0 weight percent carbon dioxide as ammonium carbonate.

The reaction was again repeated by charging 800 grams of ammonium hydroxide, 5 grams of 2-chloropyridine and 0.2 gram of powdered rhodium metal to the autoclave. The autoclave was pressured to about 56 atmospheres with carbon monoxide and heated to 200° C. and maintained at that temperature for two hours. Upon completion of the two hour period the autoclave was cooled and its pressure was observed to be about 48 atmospheres. The autoclave was then depressured and opened and the liquid contents weighed to reveal a 23 gram weight increase. The gas collected from the autoclave was analyzed and found to contain 20.3 percent hydrogen and 0 percent carbon dioxide.

Example 2

The following experiments will illustrate the use of a heterocyclic basic nitrogen compound as the added nitrogen material. In the first experiment the autoclave was charged with a mixture of 400 grams pyridine, 400 grams water, 0.33 gram rhodium trichloride and 3 grams of 2-chloropyridine. The autoclave was closed and pressured to about 56 atmospheres with carbon monoxide and heated to 200° C. and maintained at that temperature for two hours. Upon completion of the two hour period, the autoclave was cooled and the final pressure was about 78 atmospheres. The autoclave was depressured and opened and the liquid contents weighed to reveal a 37 gram weight decrease. The gases collected from the autoclave were analyzed and found to contain 10.82 percent hydrogen and 8.76 percent carbon dioxide.

The reaction was repeated using 400 grams pyridine, 400 grams ammonium hydroxide and 0.33 gram iridium tetrachloride. The autoclave was closed, pressured to about 56 atmospheres with carbon monoxide and heated to 200° C. and maintained at that temperature for two hours. Upon completion of the two hour period the autoclave was cooled and the pressure was observed to be about 56 atmospheres. The autoclave was depressured and opened and the liquid contents weighed to reveal a 16 gram weight decrease. The liquid was analyzed and found to contain 8 percent carbon dioxide as ammonium carbonate and the gas collected from the autoclave was analyzed and found to contain 14.3 percent hydrogen and 1.5 percent carbon dioxide.

The autoclave was charged with 400 grams pyridine, 400 grams water and 0.14 gram rhodium trichloride. The autoclave was closed, pressured to about 56 atmospheres with carbon monoxide. heated to 200° C. and maintained at that temperature for two hours. The autoclave was cooled and the final pressure was observed to be about 68 atmospheres. The autoclave was depressured and opened and the liquid contents weighed to reveal a 56 gram weight decrease. The vapor collected from the autoclave was analyzed and found to contain 24.3 percent hydrogen and 25.3 percent carbon dioxide.

The liquid recovered from the previous experiment was returned to the autoclave and 30 grams of water was added thereto. The autoclave was closed, pressured to about 56 atmospheres and heated to and maintained at 200° C. for two hours. The final pressure of the autoclave after cooling was about 68 atmospheres. The autoclave was then depressured, opened and the liquid contents weighed to detect a 58 gram weight decrease. The liquid was analyzed and found to contain 1.4 weight percent carbon dioxide and the gas phase was analyzed and found to contain 12.0 percent hydrogen and 10.3 percent carbon dioxide.

Example 3

The following examples illustrate the use of other amines as the basic nitrogen compound.

In the first experiment the autoclave was charged with 400 grams tetramethylethylenediamine and 400 grams water and 0.33 gram of rhodium trichloride. The autoclave was closed and pressured to about 56 atmospheres with carbon monoxide and then heated to and maintained at 200° C. for two hours. Upon completion of the reaction period the autoclave final pressure after cooling was about 49 atmospheres. The autoclave was then depressed and opened and the liquid contents weighed to detect an 11 gram weight increase. The liquid was analyzed and found to comprise 14.6 weight percent carbon dioxide and the gas phase was analyzed and found to contain 33 percent hydrogen and 9 percent carbon dioxide.

The liquid phase from the preceding experiment was recharged to the autoclave with the addition of 50 milliliters of water and the reaction was repeated to observe in two successive recycles a 90 and a 50 gram weight decrease and comparable activity for the formation of hydrogen.

The autoclave was charged with 400 grams ethylene diamine and 400 grams water, 0.2 gram platinum oxide and 5 grams of hydrazine hydrate. The autoclave was closed, pressured to about 56 atmospheres with carbon monoxide and heated to 200° C. and maintained at that temperature for two hours. Upon completion of the two hour period and upon cooling the autoclave pressure was about 38 atmospheres. The autoclave was depressured and opened and the liquid contents weighed to detect a 126 gram weight increase. The liquid was analyzed and found to contain 6.6 weight percent carbon dioxide and the gas separated from the autoclave was analyzed and found to contain 1.7 percent carbon dioxide and 35.0 percent hydrogen.

The reaction was repeated by charging to the autoclave 400 grams water, 400 grams ethylenediamine and 0.2 gram platinum oxide. The autoclave was pressured to about 8 atmospheres with carbon monoxide and to about 56 atmospheres with argon and heated to 200° C. and maintained at that temperature for two hours. Upon completion of the two hour period and upon cooling the autoclave pressure was observed to be about 53 atmospheres. The autoclave was depressured and opened and the liquid contents weighed to detect a 2 gram weight decrease. The gas separated from the autoclave was analyzed and found to contain 0.2 percent carbon dioxide and 23.0 percent hydrogen.

The reaction was performed with a rhodium catalyst by charging to the autoclave 500 grams water, 300 grams ethylene diamine, 0.33 gram rhodium trichloride and 5 grams hydrazine hydrate. The autoclave was pressured to about 8 atmospheres with carbon monoxide and to about 56 atmospheres and heated to 200° C. and maintained at that temperature for two hours. Upon completion of the two hour period and upon cooling the autoclave pressure was about 53 atmospheres. The autoclave was depressured and opened and the liquid contents weighed to reveal a 10 gram weight increase. The gas separated from the autoclave was analyzed and found to comprise 54.0 percent hydrogen and 0.6 percent carbon dioxide.

The experiment was repeated by charging to the autoclave 400 grams ethanolamine, 400 grams water and 0.33 gram rhodium trichloride. The autoclave was closed, pressured to about 56 atmospheres with carbon monoxide and heated to 200° C. and maintained at that temperature for two hours. Upon completion of the two hour period the autoclave was cooled and the pressure was about 42 atmospheres. The autoclave was depressured and opened and the liquid contents weighed to reveal an 88 gram weight increase. The liquid phase was analyzed and found to contain 11.6 weight percent carbon dioxide. The gas phase collected during the experiment was analyzed and found to comprise 37.7 percent hydrogen and 7.7 percent carbon dioxide.

The reaction was repeated by charging to the autoclave 200 grams of triethylenediamine, 600 grams water, 0.33 gram rhodium trichloride and 3 grams triphenylphosphine. The autoclave was closed, pressured to about 8 atmospheres with carbon monoxide and to about 56 atmospheres with argon and heated to and maintained at 200° C. for two hours. Upon completion of the two hour period the autoclave was cooled and the pressure was about 52 atmospheres. The autoclave was depressured and opened and the liquid weighed to reveal a 23 gram weight increase. The reaction produced a total of 68 grams of carbon dioxide and an equivalent amount of hydrogen.

The reaction was repeated by charging to the autoclave 800 grams water. 150 grams glycine, 0.33 gram rhodium trichloride and 80 grams of sodium hydroxide to neutralize the glycine and produce an alkaline solution of sodium glycinate. The autoclave was closed, pressured to about 56 atmospheres with carbon monoxide and heated to and maintained at 200° C. for two hours. The autoclave was then cooled, depressured and opened and the liquid contents weighed to detect a 40 gram weight increase. The gas phase separated from the autoclave was analyzed and found to contain 7.5 volume percent hydrogen and 4.4 volume percent carbon dioxide.

Example 4

The following examples illustrate the results obtainable utilizing a metal inorganic base and demonstrates that the basic nitrogen compound has a greater beneficial affect on the Group VIII noble metal catalyst than does an inorganic metal hydroxide. The autoclave was charged with 700 milliliters water, 20 grams sodium hydroxide and 1 gram of 5 weight percent rhodium metal on charcoal. The autoclave was closed, pressured to about 56 atmospheres, then heated to and maintained at 200° C. for 2 hours. The autoclave was then cooled, depressured and opened and the gas product was then analyzed and found to contain 0.5 volume percent hydrogen and 0.9 volume percent carbon dioxide. This minor amount of hydrogen formed compares unfavorably with the far greater amount of hydrogen formed in Examples 1–3 wherein a basic nitrogen compound was utilized.

Example 5

This example illustrates the results obtained when a basic nitrogen compound is not added to the shift reaction medium. The autoclave was charged with 800 milliliters water, ⅓ gram of rhodium chloride and 3 grams of triphenylphosphine. The autoclave was closed, pressured to about 56 atmospheres with carbon monoxide and heated to and maintained at 200° C. for 4 hours. The autoclave was then cooled, depressured and opened and the gas product was analyzed and found to contain 0.7 volume percent carbon dioxide and 0.5 volume percent hydrogen.

I claim:
1. A process for the production of hydrogen and carbon dioxide comprising contacting carbon monoxide with an aqueous liquid phase containing a minor amount of a Group VIII noble metal and a basic nitrogen compound selected from the class consisting of ammonium hydroxide, hydrazine, alkyl and cycloakyl amines containing up to 10 carbons, and bifunctional alkanolamines, polyamines, bicycloamines and aromatic heterocyclic amines containing up to 25 carbons in an amount sufficient to maintain said aqueous liquid phase at a pH above 7.1 at a temperature between about 50° and 650° C. and to increase the reactivity of the Group VIII noble metal and at a pressure sufficient to maintain liquid phase reaction conditions.

2. The process of claim 1 wherein said basic nitrogen compound is ammonium hydroxide.

3. The process of claim 1 wherein said basic nitrogen compound is an aromatic heterocyclic amine having up to 25 carbons.

4. The process of claim 3 wherein said amine is pyridine.

5. The process of claim 1 wherein said Group VIII noble metal is rhodium, iridium or platinum.

6. The process of claim 5 wherein said metal is rhodium.

7. The process of claim 1 wherein the Group VIII noble metal is rhodium and wherein said basic nitrogen compound is ammonium hydroxide, pyridine, ethylene diamine, ethanolamine, or tetramethylethylene diamine.

8. The process of claim 7 wherein the reaction temperature is 100–250° C.

9. The process of claim 2 wherein said Group VIII noble metal is rhodium.

10. The process of claim 4 wherein said Group VIII noble metal is rhodium.

11. The process of claim 1 wherein said basic nitrogen compound is an alkyl or cycloalkyl amine or a bifunctional alkanolamine which forms a stable carbonate at the reaction conditions and boils at a temperature higher than that necessary to decompose a carbonate of the amine.

References Cited

UNITED STATES PATENTS

| | | | |
|---|---|---|---|
| 1,843,540 | 2/1932 | Casale | 23—211 XR |
| 2,829,113 | 4/1958 | Barry et al. | 252—376 |
| 3,251,652 | 5/1966 | Pfefferle | 23—213 |
| 3,271,110 | 9/1966 | Bratzler | 23—213 |
| 3,382,044 | 5/1968 | Cromeans | 23—213 XR |
| 3,397,962 | 8/1968 | Squires | 23—213 |
| 3,410,661 | 11/1968 | Taylor | 23—213 |
| 3,418,082 | 12/1968 | Ter Haar | 23—213 |

EDWARD STERN, Primary Examiner

U.S. Cl. X.R.

23—150, 211; 252—373